Patented Feb. 13, 1951

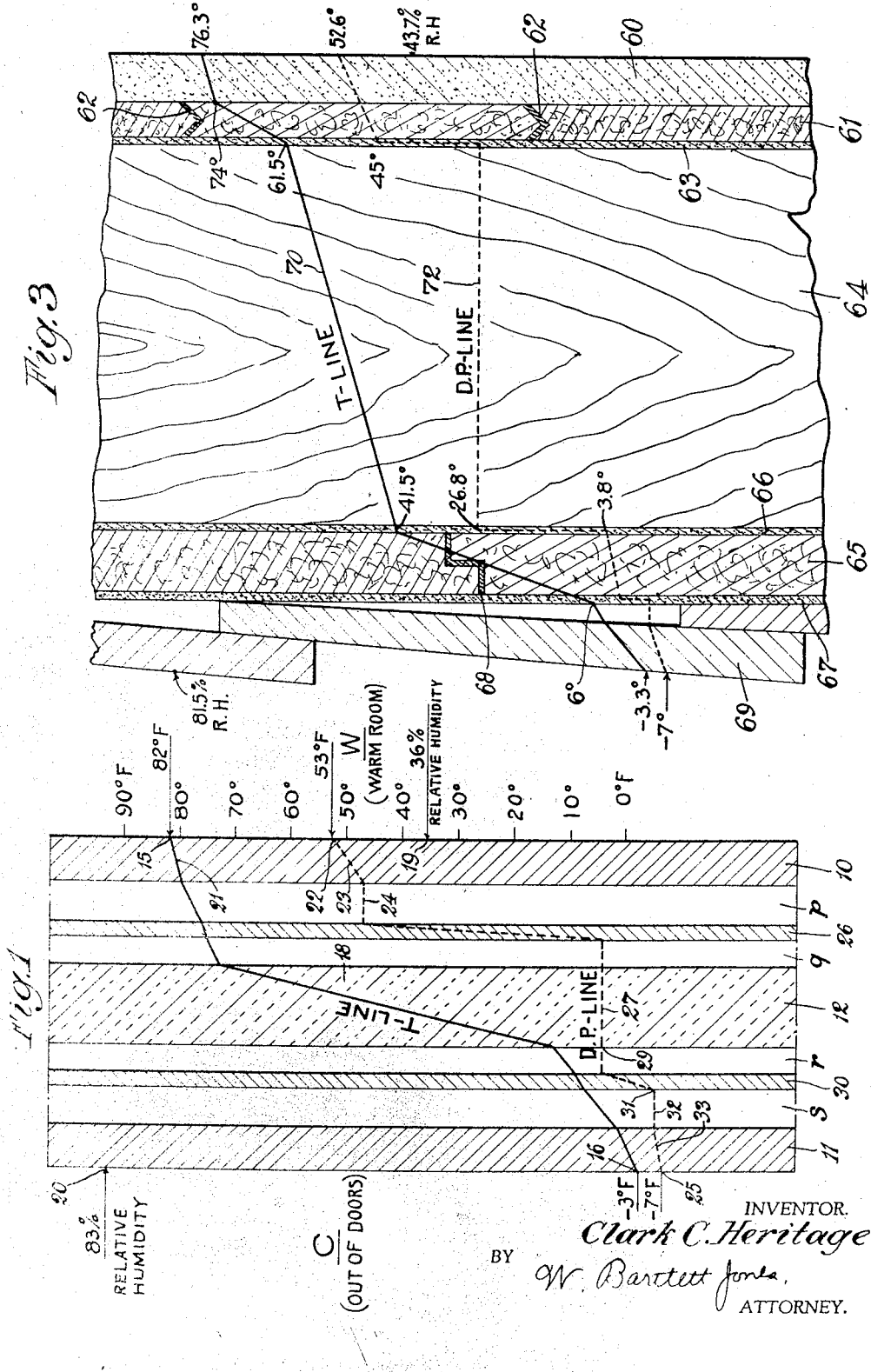

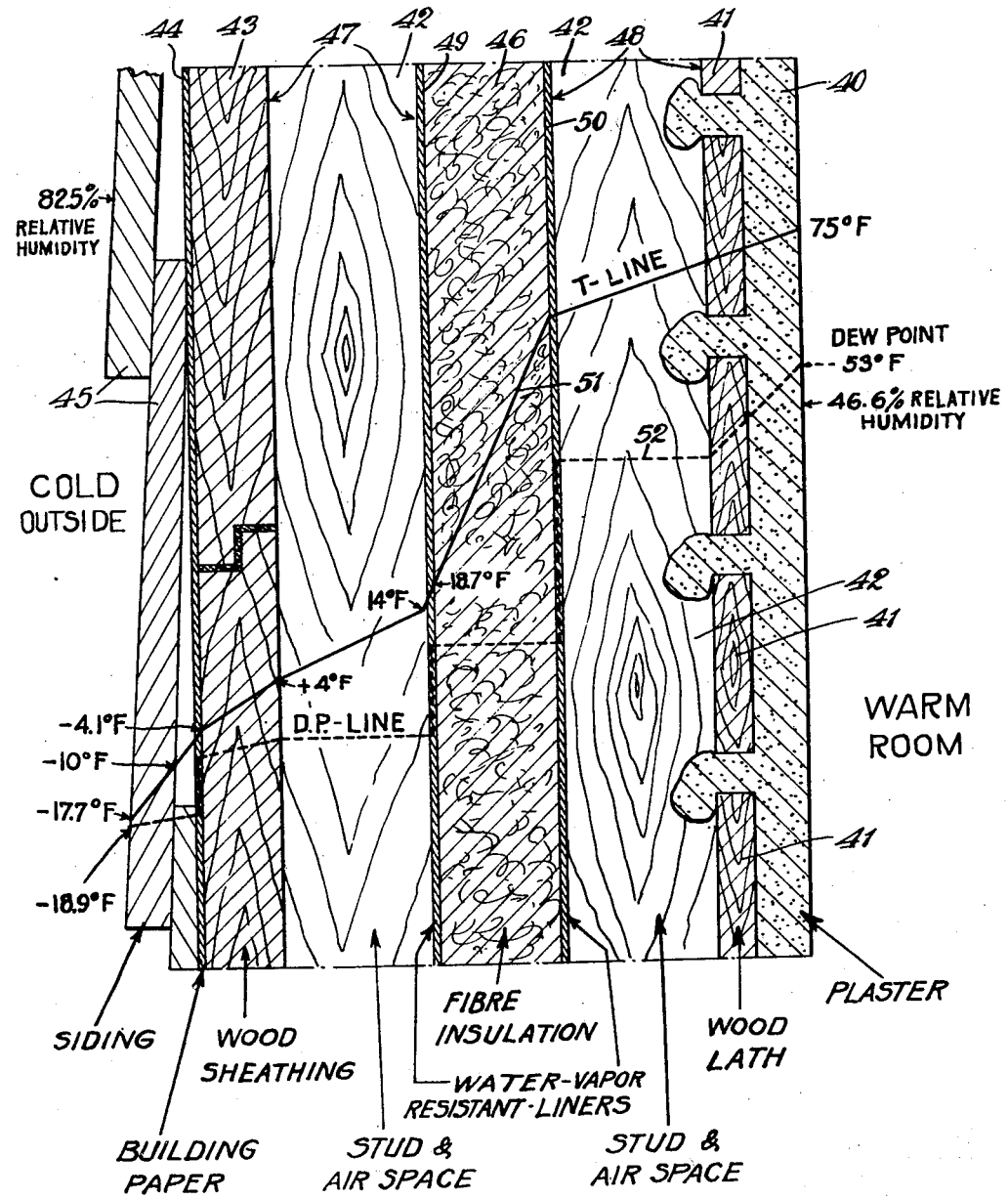

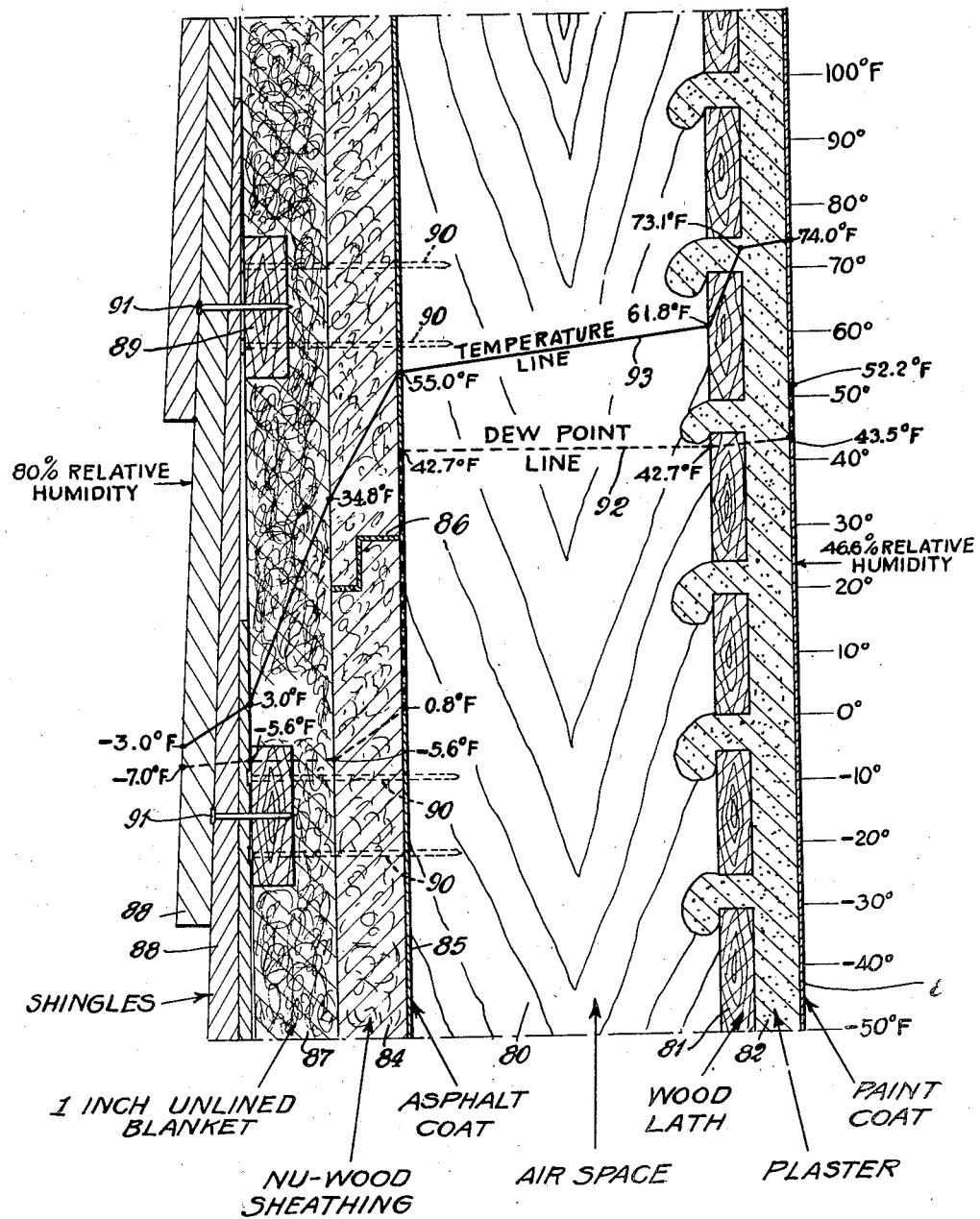

2,541,762

UNITED STATES PATENT OFFICE 2,541,762

DRY-WALL CONSTRUCTION

Clark C. Heritage, Cloquet, Minn., assignor to Wood Conversion Company, St. Paul, Minn., a corporation of Delaware Application December 4, 1943, Serial No. 512,868

2 Claims. (Cl. 20—4)

The present invention relates generally to thermal insulation and resistors to the flow of water vapor, and in particular to thermally insulated and water-vapor-resistant space-enclosing or separating structures.

The problem of heat insulation between atmospheric air volumes of different temperatures is complicated by water vapor in the air, and by the property of water-vapor in air to condense at a precise temperature dependent upon water-vapor content. Practically, a space-enclosing structure perfectly designed for thermal conductivity may fail because of condensation of vapor to water in the wall or even in the insulation. This may change the thermal conductivity. More important, however, is the resulting damage to the insulation and to the structural elements. Many structures heretofore employed in disregard of the problem of condensation, or more particularly without adequate design knowledge, have failed in whole or in part, or permanently or temporarily. Some damaged walls eventually dry out, restoring insulating value. Some types of insulation material are permanently impaired. Some types of insulation have been protected against damage by sealing it in means suitably exclusive of moisture to prevent such damage to the insulation, but not necessarily to the structure as a whole.

The present invention aims to build such a structure of various unit members or various layers, so chosen and so arranged that it is impossible under assigned terminal conditions or extremes of normal usage to effect condensation in the structure.

A particular object of the invention is the provision of a structure, such as a wall, ceiling, roof or floor, between indoor living quarters and like spaces, and the out-of-doors, or like spaces, which structure normally functions to prevent the condensation of vapor therein under all normally encounterable conditions, and particularly when conditions are most favorable for it, i. e., in the cold winter weather with warm humidified interior.

The invention is represented generally and specifically in the accompanying drawings in which:

Fig. 1 represents diagrammatically a wall developed according to the invention.

Fig. 2 represents a vertical sectional view of a house-wall so provided with insulation and water-vapor resisters as to conform to the present invention.

Fig. 3 represents a vertical sectional view of a house-wall in which common wood lath and sheathing are replaced by insulation board having appropriate water-vapor flow-resisting properties for the present invention.

Fig. 4 represents a vertical sectional view of a house-wall construction embodying the present invention.

From a theoretical standpoint, the objects may be readily obtained by numerous constructions, at considerable expense and with departure from practical values and considerations. For example, a sealing of the warm side by means, such as metal sheets which are perfect barriers to the transmission of water-vapor, considering even welded joints, would suffice to protect the wall whatever its construction. However, such sealed chambers are unhealthful for human occupancy because humidity will rise to an uncomfortable degree, and windows will steam or frost heavily in cold weather, with dripping or heavy melting in prospect. A degree of leakage of moisture from the room and through the wall is desirable. Much thought and effort have been given to the problem of avoiding such leakage where common commercially practical materials are used, yet no adequate principles have been established whereby available materials may be assembled to effect a leakage of vapor, yet one so controlled that the leakage does not result in condensation.

Practice of the invention involves the proper use of physical data or property values respecting the separately considered materials for the layers of the structure. For the purpose of explanation, assume a warm humidified interior W (Fig. 1), a cold exterior C, and an insulating partitioning structure comprised of interior structural finish 10, exterior structural finish 11, thermal insulation 12, and intervening air spaces $p$, $q$, $r$ and $s$. The insulation 12 is represented as one open to the movement of air through it as permitted by a fiber felt. Of course, the finishing layers 10 and 11, and the air spaces, have insulating value. Each layer 10, 11 and 12 also has some capacity to transmit water vapor. The amount of water vapor transmitted will, of course, depend upon the said resistivity of each layer, and upon the differential water-vapor pressure across each layer. At an equilibrium condition, the concentration of water-vapor exerting a water-vapor pressure, the actual temperature, and also a dew-point temperature, may be positively expressed for any chosen point in the wall. By taking successive points in the structure, a number of values for each or all of these may be obtained which will determine a continuous line or plot on a suitable scale. There will be a temperature line, hereinafter called the T-line, and a dew-point temperature line, hereinafter called the DP-line. The T-line is readily expressed in degrees as thermometer readings. The water-vapor concentration may be expressed in various terms, such as water-vapor pressure, or dew-point temperature, or weight per unit volume, or as relative humidity when given the temperature. The terms are related and relations can be found in available tabulations in hand books and tables, or charts used in the art.

The T-line through a wall has its terminals located by the conditions the wall is to meet. But its course between said terminals may be controlled by placing insulating elements or layers in the wall. Likewise, water-vapor resisters may be placed in the wall to control the passage of water-vapor and the vapor concentrations in various layers. Hence, the resisters acting in concert locate a dew-point temperature or DP-line through the wall between terminals fixed by the regions separated by the wall. The T-line and the DP-line can, through the present invention, be independently controlled and, in so doing, the object of the invention is to keep the temperature-line always above the dew-point-line in the operation of the wall.

In the wall, the T-line will drop from the warm-side temperature to the cold-side temperature and have a form according to the relative thermal resistivities of the individual elements comprising the wall. The greater the thermal resistivity of a layer relative to resistivities of the other elements of the wall, the steeper will be the included portion of the T-line. In Fig. 1, the warm side of the wall has a temperature represented at 15 as 82° F. The cold side of the wall has a temperature represented at 16 as —3° F. The T-line will run from 15 to 16, and is designated 18.

It is well-known that static air adjacent the wall surfaces, to a limited thickness of about ¾ inch, acts as an insulating blanket, whereby the regions W and C of Fig. 1 are, respectively, slightly warmer and colder than the wall surface temperatures given, where the air is static.

Table I, below, shows that the interior wall finish layer 10 has the poorest insulating value $a$, that the outside layer 11 has a better insulating value $a+b$, and that layer 12 (depended upon primarily for its insulation value) has a high insulation value indicated as $a+b+I$. Each layer of air has value $d$. These indications, $a$, $b$, $I$ and $d$ clearly show the relative capacities which determine the steepness of the included portions of the T-line 18. Table I also shows values representing the coefficients of resistance to the transmission of water-vapor for the elements of the wall structure of Fig. 1, the layers of air and the insulation 12 having substantially no resistance to vapor-flow.

*Table I*

| Layers of Fig. 1 | Relative Insulation Value | Coefficients of Resistance to Transmission of Water-Vapor |
|---|---|---|
| 10 | $a$ | $x$. |
| 11 | $a+b$ | $y$. |
| 12 | $a+b+I$ | negligible. |
| 26 | negligible | $z$. |
| 30 | do | $z'$. |
| $p$, $q$, $r$ and $s$ | (each) $d$ (and greater than $a$) | negligible. |

In table I, specific values are not given, since their values may change without change of result, so long as the changed values keep the same relation. This is true for thermal conductivity and for vapor transmission. Doubling all the insulation values and keeping the vapor resistance unchanged will not change the positions of the stepped curves.

The relative humidities of the warm and cold regions W and C fluctuate greatly with weather conditions and internal air-conditioning. Water-vapor in air will precipitate where the actual air temperature falls below the dew-point temperature for that air. Hence where the T-line approaches the DP-line in a wall, the danger of condensation is imminent; where it intersects, condensation is taking place.

The invention is concerned primarily with transfer of water-vapor from moist air on the warm side, considering that convective movement of air into the wall is non-existent or negligible. If air moves by convection into or through a wall, naturally the moisture goes with it. But water-vapor may pass through a body independently of air. A material such as a sheet of paper which is differentially permeable to passage of water-vapor, air, or other gases, will transmit water-vapor in a quantity proportional to the water-vapor pressure differential imposed across it without movement of air. Reference to a material in terms of its resistance to the transmission of water-vapor involves this element of differential vapor pressure. Also, with thermal insulation the thermal conductance is expressed in terms of temperature differential. The invention contemplates a proper combination of water-vapor resisters and thermal insulating elements, or single materials acting as both, so that in an assembled wall the temperature-line through the wall must not intersect, and preferably must not approach too closely, the dew-point-line through the wall, for assigned extremes of terminal conditions to be encountered in operation of the wall.

In Fig. 1, a common value for the relative humidity of the interior W is shown at 19 as 36%. At the same time, a common out-of-doors value of relative humidity (outside wall temperature —3° F.) is 83%, as shown at 20. The actual water-vapor content is, of course, highest on the warm side, so that vapor pressure for vapor movement is from W to C. Assume that the layer 10 slightly impedes the transmission of water-vapor, according to its coefficient of resistance $x$ shown in Table I. Therefore, water-vapor pressure declines toward cold side of element 10. Assume but a slight drop in the T-line in layer 10, as represented by numeral 21. At the warm side W of the wall where the relative humidity (at 19) is 36%, and the wall surface temperature is 82° F., the dew-point temperature is 53° F., as shown at 22. The dew-point line is shown as dropping slightly in the layer 10 as by line 23 to the level 24 in the air space $p$ between layer 10 and layer 12. Under conditions thus described, the T-line 21 and the DP-line 23 remain properly separated in layer 10.

The outside relative humidity of 83% at —3° F. cold wall surface temperature, corresponds roughly to a dew-point of —7° F. This is represented at 25, and it is a terminus for the DP-line which terminus remains unchanged regardless of the wall structure. This terminus 25 and terminus 22, together with the elements of vapor resistance in the wall, determine the location of the DP-line.

The primary insulation layer 12 shows a steep drop in the temperature-line 18, or the T-line. If the actual water vapor content in the layer 12 were the same as at the level 24 in the DP-line, it is certain from the drawing that the T-line 18 would meet the DP-line, which would in that case run horizontally from level 24 into the insulation 12. To avoid this, the dew-point in insulation 12 must be depressed. This is accomplished by lessening the water-vapor content in the insulation 12 to such a point that throughout the insulation, the DP-line is forced below the T-line. Hence a water-vapor resister 26 is placed between layers 10 and 12. Its insulation value is negligible, as assigned in Table I. Its vapor transmission resistance is $z$ as shown in Table I. The water-vapor resistivity of insulation 12 may be neglected and considered as zero, which is true where the insulation is a loose fibrous mass. Hence in insulation 12 there will be no change in the DP-line, and it will be horizontal, as at 27, at some location well below the level 24. Where the portion 27 of the DP-line in layer 12 hits the cold boundary of the insulation 12, at 29, it will be seen there is even more danger of the T-line meeting the DP-line if vapor content remains the same in air space $s$ and in layer 11 as in layer 12. To avoid this, a water-vapor resister 30 in sheet form, having resistance $z'$ (Table I), is used to drop the DP-line to point 31 on the cold side of the resister 30 from the level of point 29 on the warm side of resister 30. From point 31, the DP-line proceeds as level line 32 in the air space $s$ and drops as line 33 to terminal point 25, in layer 11, having water-vapor resistance $y$. DP-line 33 is not horizontal in layer 11 because of some resistance to transmission of water-vapor, according to its resistance $y$ (Table I).

In reviewing the above, it is seen that the course of the temperature-line through a wall will drop with a stepped-like slope with the steps variably inclined according to the relative thermal resistances. Also, the course of the dew-point-line will vary with a stepped-like slope, with some steps which are substantially flat where there is little or no impedance of water-vapor movement, with other steps more steeply sloped where there is partial impedance, and other steps practically vertical where there is a pronounced and concentrated resistance, as in a sheet resister such as 26 and 30. The aim is to keep the thermal steps always above the dew-point steps. Wherever analysis shows there is a meeting, or danger of meeting, under any tested set of conditions, the dew-point steps may be lowered by proper location of a water-vapor resister. If the resister has no real thermal insulating value, it will affect only the dew-point steps and not affect the thermal steps. The insertion of a water-vapor resister inside a given wall shifts the location of the entire dew-point-line between its terminals, which, of course, remain fixed. The portion on the warm or humid side of such a new resister is raised from its former position, and the portion on the cold or drier side of the new resister is lowered from its former position. In preferred practice, such new insertions are made as sheet resisters having no thermal insulating value, whereby they may be employed to adjust the position of the dew-point line with respect to a fixed temperature-line.

Also it will appear from the above explanation that a thermal resistance having negligible vapor resistance may be inserted in or removed from a wall to shift the position of the T-line with respect to a fixed DP-line. An added thermal resistance at any zone will lower the T-line from its former position on the cold side of the added resistance and will raise the T-line from its former position on the warm side of the added resistance. Conversely, removal of thermal resistance will raise the T-line on the cold side of the altered zone, and lower the T-line on the warm side of the altered zone. Correction of a wall for dry conditions may, in some cases, be effected by removal of thermal resistance.

From the foregoing discussion, it appears that building material for walls and other space-enclosing structures may best be provided in two kinds, one with high insulation value and negligible water-vapor resistance, and the other with high water-vapor resistance and negligible insulation value. These may be combined as required. They may be separate entities for combination, or combined entities to give useful units for combination, as for example, a layer of fibrous insulation, carried by, and sealed between two sheets of water-vapor resisters. Additional water-vapor resisters may be spaced within the thermal insulation provided its thickness and the corresponding temperature-line may call for an additional downward step in the dew-point-line. Standard materials entering into wall structures, such as lath, plaster, sheathing, shingles, siding, building paper, stucco, wall board, and the like, may all enter into the present invention. The coefficients of thermal transmission and water-vapor transmission are known or may readily be determined. These data may be used in designing a wall on paper, and plotting thereon the T-line, and the DP-line for any chosen condition to which the wall may be subjected. Wherever the DP-line steps approach the T-line steps too closely the insertion of a poorly-insulating element of the required degree of water-vapor resistivity, preferably as a sheet, at a chosen position in the wall will lower the DP-line at the danger point. Such correction may be made by shifting the T-line with respect to a substantially fixed DP-line, by inserting in a chosen position in the wall a suitable layer of thermal resistance, or even removing one, where such layer has a poor or negligible resistance to vapor transmission. The drawing of the assembly will show where and how this may be easily or most economically effected, and the plan may be accordingly corrected and perfected.

It is not implied that speculation has heretofore not indicated how a perfect wall may be constructed, but certainly it has not been followed, when the simplest tests reveal the deficiences of walls with but one major water-vapor resistance included in the design. Many publications in the field by reputable investigators even recommend that air spaces in walls be suitably vented to the out-of-doors to permit circulation of air into and out of them, for the purpose of evaporating water of condensation which may take place in the wall. Any such recommendation for any particular wall is a condemnation of that wall as one not free from the danger of condensation. The only reliable recommendations heretofore made have been instructions to use perfect water-vapor barriers, or stops, such as aluminum foil of certain minimum allowable weight and thickness. These are costly, and must be installed to insure against rupture and deterioration. The present invention is important in teaching how one may correctly use inexpensive materials, and common materials, which are not stops or barriers, but rather are both transmitters and resisters, which two characteristics are each advantageous although in opposition. As pointed out above, exfiltration of water-vapor from human quarters is desirable, but it must be accomplished in controlled steps within the wall, or on a DP-line located always below the operating T-line of the wall, to protect the wall or other transmitting structure.

The explanation given above is in reference to cold-weather conditions, and it is necessary to consider the warm-weather functioning.

In reference again to Fig. 1, as it will now be understood, assume that the room interior W is relatively colder than outside and is also dehumidified, as in summer. The disclosed internal temperature will suffice, and the humidity will perhaps be much greater than shown. The temperature-line will be much flatter, and reversed in its course, running down from C to W, and it will be nearer to the top of the figure. The relative humidity in outside region C will be high and can be near 100%. Then the dew-point out-of-doors will be nearer the atmospheric temperature and above the inside-dew-point. Thus, the dew-point depression from atmospheric temperature will be less on the out-of-doors side than on the indoors side. The dew-point stairs will run down from left to right. The temperature-stairs will run down from left to right. In Fig. 1 (cold-weather), the two stairs converge as they go down. In the extreme warm weather conditions cited, they diverge as they go down, and hence there is no danger of meeting to establish condensation.

In the warm-weather condition where the interior is cooled and not dehumidified, the two gradients will run nearly parallel, with closer terminals. In both structural layers 11 and 10, both the temperature-line and the dew-point-line will be more nearly horizontal. The dew-point-line will be horizontal in a felted-fiber layer 12, but will have nearly vertical courses in the water-vapor sheet resisters 30 and 26. Just as the said vertical portion is longer in the resister 26 near the warmer more humid side W in Fig. 1, so it will be longer in resistor 30 for warm weather, and thus it will be kept below the summer time temperature-line.

In the following description, there are given three examples of walls constructed according to the invention, showing considerable variation in type.

Fig. 2 represents the design of a wall which is just satisfactory as shown, and which can be improved as will be indicated.

In Fig. 2 a practical wall is shown with its determinant temperature and dew-point lines, following the explanation above given. On the interior there is ½ inch of plaster 40 on ⅜ inch wood lath 41, secured to standard nominal 2-inch x 4-inch studs 42. On the exterior there is wooden 25/32 inch sheathing 43, a minor water-vapor resistance in the form of common porous felt building paper 44, and wood siding 45, having maximum application thickness of about ¾ inch. In the spaces between studs 42 there is a 1 inch thick layer of insulation 46 with equal air spaces 47 and 48 on each side of it, and sheet water-vapor resisters (not identical) 49 and 50 secured to the insulation respectively between the insulation 46 and sheathing 43, and insulation 46 and lath 41. The insulation shown is a felted mass of wood fibers carried by and between asphalt paper liners which are the resister sheets 49 and 50, with sealed edges providing flanges (not shown) for fastening the insulation tightly to the studs.

Such type of insulation blanket is well-known on the market, without, however, bearing liner sheets of controlled water-vapor resistance with respect to any given wall-assembly.

Liner sheets have been applied to insulation blanket or felt for various reasons. Initially, they were merely kraft paper with no vapor resistant properties. Later, asphalted paper was used for water-resistance (which bears no relation to water vapor flow resistance). Now that it is known that vapor resistance is important those liners which are vapor resistant are proclaimed as such, without, however, any requirement that certain relative resistance values are required for one wall construction, and other relative resistance values for a different wall construction. Where a commercial insulation blanket with one or more vapor resistant liners is used for the present invention, the entire wall must be constructed with reference to the insulating value, the vapor resistance, and the positioning of the blanket in the wall.

In practicing this invention, the wall design is made graphically using a construction which is mechanically practicable, considering the costs, material, and insulating value. First, a set of extreme-use test conditions is chosen, such as 81° F. for the room interior, giving about 75° F. at the wall surface, with 46.6% relative humidity at the wall (and 37.9% in the room) and —19° F. for the exterior atmosphere with about —17.7° F. at the wall, where the relative humidity at the wall is 82.5% (and 89% away from the wall). From the known heat transmission characteristics of the plaster, lath, insulation, sheathing, and siding, the thermal gradient may be drawn by any one skilled in the art, using the following fundamentals:

The thermal resistance of an assembly, such as a wall, equals the sum of the thermal resistances of the elements in series in the assembly.

The thermal resistance value of an element is the reciprocal of the thermal transmission value of the element.

The transmission value of an element is expressed in terms of heat units passed in a given time per given area per given temperature differential across the element.

Static air up to about ¾ inch in depth away from a body has an appreciable insulation value which should be included in the calculations.

In an assembly at equilibrium between constant terminal conditions, every thermal resistance element in the wall passes the same number of heat units.

The temperature difference $dT$ across each thermal resister is proportional to the thermal resistance R, or $dT = kR$ where $k$ is a constant.

Quite similar laws hold for vapor resisters.

The partial pressure of water-vapor $dP$ across each independent vapor resister is proportional to the vapor resistance V, or $dP = k'V$, where $k$ is a constant.

An independent water-vapor resister is one having plane boundaries which are exposed to be acted upon by atmospheres containing water-vapor to create the required differential water-vapor pressure.

The presence of mat or any foreign material in the flanking body of gas to which a said plane boundary is exposed, with or without adhesion or contact of such material with respect to the surface of a water-vapor resister, makes the combination of the material and the body the independent water-vapor resister for the above laws.

Thus, in Fig. 2, the lined insulation blanket 49—46—50 is the independent resister element, in addition to being a thermal resistant element.

With respect to the passage of water-vapor there is also a set of fundamental relations.

The water-vapor resistance of an assembly, such as a wall, equals the sum of the resistances of the independent vapor resisters in series in the assembly.

The water-vapor resistance value of an element is the reciprocal of the water-vapor transmission value of the element.

The water-vapor transmission value of an element is expressed in terms of amount of water passed in a given time per given area per given water vapor partial pressure differential across the element.

In an assembly at equilibrium wherein no condensation takes place, the amount of water-vapor passed by each element is the same.

In Fig. 2, it will be noted that the warm side room dew-point (if extended into the wall) will cross the T-line 51 at its steep slope in insulation 46. This indicates that a water-vapor resistance must be present between the insulation 46 and the room atmosphere. Practically, this is present in part as the lath and plaster and as liner 50 which is part of the insulation blanket 46, which blanket also provides a different resister on the other side. Since it is practical (and common practice) to have the building paper 44, there are thus provided four major vapors resistances, but only three major independent resisters for calculations using the law of additive resistances. These are: (1) the lath-and-plaster, (2) lined insulation blanket, and (3) building paper 44 in contact with siding 45 and sheathing 43. The courses of both the temperature-line and the dew-point-line may not be determined without considering all the elements of the wall predetermining them. Therefore, before the dew-point-line (DP-line) 52 may be drawn, the whole assembly must be temporarily indicated. Given the assembly described and the vapor-transmission characteristics of the independent resisters (see Table II following), the amount of water-vapor present, as in terms of partial vapor pressure, at each zone at equilibrium condition may be determined. From this the dew-point-line 52 (DP-line) is plotted on the same scale as the T-line 51. These are all indicated in Fig. 2, with various values marked.

It has been pointed out that the lined blanket 49—46—50 is an independent resister in the structural wall assembly, whereby the DP-line in the adjoining air-spaces may be calculated. The formulas applicable to isolated sheet vapor resisters, for calculating vapor pressures or dew points in adjacent air spaces, do not apply when the air space adjacent the resistor sheet carries material such as an insulating body. Hence, these formulas cannot be used to calculate the vapor pressure in the air within blanket 46, considering the two liners 49 and 50 as independent resister sheets, because they are not such sheets. The whole blanket 49—46—50 must be considered as an isolated compound water-vapor resister. But this space within the blanket, and filled with the fiber felt 46 is an important zone to be protected. In order to calculate the dew point within insulation, such as blanket 46, flanked by two water-vapor-resistant liners, such as 49 and 50, the whole assembly 49—46—50 being a unitary water-vapor resister, the blanket may be considered as split medially to provide a central air space, with respect to which the dew point may be calculated, thus providing two unitary water-vapor resisters for the calculation, such as 49—46 and 46—50. By employing elements to give an adequate separation, in the unitary blanket, of the D-P line and the T-line, slight errors from neglected factors resulting from such theoretical splitting may be safely ignored.

The drawing shows an operating wall with the dew-point stairs below the temperature stairs. However, it is near the limiting condition, at liner 49, and at the building paper 44 on the warm sides of each. From the foregoing explanation, it is obvious that this wall could be improved by having the first vertical drop in the dew-point-line 52 at a point closer to the plaster from the warm side of the insulation 46. This may be effected by a resister associated with the lath-and-plaster. For example, a wood fiber insulation board, having body and edge sealing of vapor-resistant material, may be substituted for the wood lath 41. This substitution may introduce some additional insulation which will also lower the T-line stairs. Therefore, the whole must be recalculated to test the change. Where a non-insulating vapor-resister is inserted between the liner 50 and the room atmosphere, no recalculation will be required for the T-line. However, a recalculation will be necessary for the D-P line. Such a new barrier may be provided by a vapor resisting finish, such as suitable wallpaper, or suitable paint, applied on the room side of the plaster. It may also be a partitioning non-insulating resister sheet in the air space 48, in which case the illustrated line 52 will be broken in said space and lowered on the cold side of the break and raised on the warm side of the break, with no danger of raising any portion too high so that it would meet the temperature-line. The result may also be accomplished between liners 49 and 50, for example, by incorporating a resister sheet in the middle of the insulation 46, or otherwise, by replacing the 1 inch blanket with two lined ½ inch blankets in contact or spaced, or by placing a layer of insulation (without vapor resistance) between the siding 45 and building paper 44.

Referring again to Fig. 2, it is apparent that when the building paper 44 is omitted, when siding is made more open, and when butt-joined sheathing is used, or other special designs for opening up the cold side structure are employed, so that there is substantially no vapor resistance from space 47 to the outside atmosphere, the out-of-door dew-point level will extend practically horizontally to the liner 49. Then the dew-point steps which lie in liners 49 and 50 and in the lath and plaster will be redistributed. More moisture will flow through the wall because there is less of total resistance. However, absolute flow is not pertinent to securing a dry wall structure. But, much more important, the cold members of the wall which are pervious to moisture vapor must not also be pervious to free flow of air, for in that case cold air will enter and lower the temperature to outside conditions, especially where wind is a factor.

By likening a wall to a pipe line carrying liquid, and likening each vapor resister in the wall to a valve in the pipe line, one will appreciate that the flow through the pipe line depends upon the adjustments, or resistances, of all of the valves, giving successive step-downs of pressure in the pipe line sections between valves, but an identical flow rate at all points.

The correctness of any calculated wall may readily be tested by making a model wall, subjecting it to fixed conditions to establish equilibrium, and measuring the actual temperature and actual dew-points at various locations in the wall to obtain the respective T-line and DP-line. In fact, the values shown in Fig. 2 have been checked by such a model.

For a normal wall construction, as shown in Fig. 2, wherein there is desired an insulation blanket of the form shown, to provide as a result a condensation-proof wall, the two liners for such insulation must each have suitable but not necessarily equal transmission values for passing water-vapor. The wall of Fig. 2 shows that it gives satisfaction in the extreme conditions marked thereon. It indicates clearly that the water-vapor resistance of one or both liners 49 and 50 may be increased for additional safety. But it also indicates that the resistance of the warm liner must be increased the more, or that a certain limiting ratio between their resistances must be maintained. Following the general rule that an added or increased water-vapor resistance at any selected point in the depth of a wall will raise the old DP-line on the warm side of the point, and lower the old DP-line on the cold side of the point, it follows that the insulation blanket of Fig. 2 may be best improved by increased resistance to vapor in its warm side liner, rather than in its cold side liner. It has been found by actual wall performance test, however, that under other external conditions of temperature and humidity the coldest elements in the wall, i. e. sheathing, building paper and siding, constitute the most dangerous points for condensation.

Fig. 3 represents a wall of a construction wherein the normal vapor-transmitting materials, such as wood lath, and wood sheathing, are displaced by vapor resistant insulating elements. There is the usual plaster 60 laid onto insulating board plaster-base 61. The plaster-base has vapor-sealed joints 62 and a predetermined vapor resistant coating 63 as of a bituminous composition or asphalt, on the cold side, which coating in the installed plaster-base is continuous with the sealed joints 62. This base 61 is approximately ½ inch thick and applied to the common 2-inch x 4-inch wooden studs 64. This vapor-resistant type of plaster-base is more fully described in my copending application Serial No. 227,254, filed August 29, 1938, now abandoned, wherein it is described that the surface coat and the sealing material in the joints of the entire wall are made continuous to effect an overall water-vapor resistance, and the sealing material in the joint is soft and yielding.

The cold side of the wall has insulating board sheathing 65 about 25/32 inch thick comparably laid on the studs to effect a vapor resistance. The sheathing has both surfaces covered or coated with a bituminous composition or asphalt, or other vapor-resistant composition or element, indicated at 66 and 67, also in a manner to seal the wall. The edges or joints are also coated to effect a yieldingly sealed joint 68. Sheets 2-feet x 8-feet with a ship-lap joint are suitable for the structure. A suitable type of board and sealing coat are described in Heritage and Walter U. S. Patent No. 2,299,144. Onto the sheathing ordinary wood siding 69 is applied, the overall application thickness being about 1 inch.

The assembly of Fig. 3 is tested by calculating the lines of temperature gradient 70, and dew-point line 72 as above described. The desired characteristics prevail. The DP-line is substantially flat in the open stud space which holds vapor, and but slightly inclined in the insulation board 61 and 65, and in the plaster 60. Where there are effective water-vapor resistances at 63, 66 and 67, the DP-line has precipitous drops. Where the insulation is best, the T-line is steepest, as in the insulation boards 61 and 65. The T-line has steps, and these lie on the warm side (or above on the scale used) of the DP-line, which has its steps in characteristic and pronounced vertical drops. The comparative vapor-resistant values of the sheathing and of the insulation are shown in Table II.

Table II

| Element | Transmission values in pounds of water as vapor transmitted per 2500 sq. ft. in 24 hours per 1 lb. water-vapor pressure differential |
| --- | --- |
| Liner 50 of this disclosure | 20 |
| Liner 49 of this disclosure | 149 |
| Unit 49, 46 and 50 | 17.6 |
| Building paper 44 | 141 |
| Plaster base 61—63 of Fig. 3 | 15 |
| Sheathing 67, 65, 66 of Fig. 3 | 18.1 |
| Open-market sheathing of Fig. 2 | 1,250 |
| Open-market Plaster base 61 (coating on cold side) | 19.3 |

A wall where the siding is free from danger of condensation, by reason of the effective vapor resistances inwardly thereof, is very advantageous. Heretofore, much trouble has been experienced by moisture forming inside of, or in the siding to produce decay, discoloration and paint failure. However, a danger point exists in member 65 on the warm side of coat 67. There is a type of insulating sheathing highly transmissive of water-vapor throughout its body and adequately resistant to it at the warm surface with suitable overall strength and rigidity for the use as sheathing at this point in a wall of the character of Fig. 3.

Furthermore, the wall of Fig. 3 is a labor-saving wall in construction. The extra step and cost of applying and providing a separate insulation blanket or unit, or fill, of no structural value to the wall, is entirely eliminated. By the provision of sheathing and of plaster-base which are both thermal insulation and water-vapor resisters, the wall may be constructed in the normal way with the customary number of elements, lacking the building paper. Such a wall is contemplated as a product of the present invention, although it is not as efficient thermally as a wall like that of Fig. 2.

There may be found on the market an insulation plaster base treated on one side which is much less vapor resistant than that employed in Fig. 3 (as shown in Table II) and also insulating sheathing treated on both sides which is much less a vapor resister than that shown in Table II. It does not follow that the disclosed combination, using such other products will produce a condensation-proof wall. For example, it is readily apparent by inspection of Fig. 3, that if the vapor resistance of layer 63 were lower, the level of the DP-line 72 in the stud space would be higher. It is also apparent that if the vapor resistance of layer 66 were lower, the level of the DP-line 72 in the sheathing 65 could cross the T-line 70, and establish conditions for condensation. This would ruin the insulation value and effect a drop in the T-line in the sheathing, which would accelerate the ruinous effect of condensation, including freezing and thawing, because temperatures at this point may be below 32° F. If the vapor resistance of layer 67 were lower, an intersection would occur in the wall at a point between paint on the siding and the sheathing. Condensation at this point is a common occurrence in many walls today, causing paint to loosen and peel. It is a vulnerable part of painted walls, and should be protected as well as the rest of the wall.

In Fig. 4 there is shown a wall construction in accordance with the present invention, and of unconventional combinations. It is suitable for a house wall having conventional upright wall studs 80. The warm or inside wall-finishing structure has wood lath 81, plaster 82, both of conventional design, and a paint coat 83 functional in the wall as a water-vapor resister. The cold or outside wall-finishing structure has first from the studs outwardly, insulation board sheathing 84 with an asphalt coat or surface 85 on its warm side, and with asphalt or like joint seals 86. The asphalt coat 85 is functional in the wall as a water-vapor resister. Although it is conventional to use insulation board sheathing coated on both sides with asphalt, in place of the illustrated covering 84, it is to be noted that no cold side coat of asphalt has been employed. Outside of and in contact with the board 84 is a loose fibrous insulation blanket 87, and over that are stained shingles 88. No vapor-resistant liners are carried by or used at the faces of the blanket 87.

Incidentally, with relation to the mechanical structure of the wall, horizontal nailing strips 89 are employed and secured to the studs at points not shown as by nails 90, to provide a base for nailing the shingles as by nails 91.

The Fig. 4 is vertically crossed by a scale of parallel temperature lines, with respect to which the DP-line 92 and the T-line 93 are plotted. The major vapor resisters are paint 83 and asphalt coat 85, and a minor vapor resister is the insulation board 84. The following tabulation gives the temperatures on the DP-line 92 at various places:

|   | °F. |
|---|---|
| Cold side of shingles 88 | −7.0 |
| Through blanket 87 and cold side of board 84 | −5.6 |
| Warm side of board 84 and cold side of coat 85 | +0.8 |
| Warm side of coat 85 | 42.7 |
| Cold side of lath 81 | 42.7 |
| Cold side of paint 83 | 43.5 |
| Warm side of paint 83 | 52.0 |

The warm air of the room and the cold out-of-doors have relative humidities of 46.6% and 80% respectively. These figures determine the vapor pressure differential over the whole wall, which in turn determines the passage of vapor through the wall, which in turn with the vapor resistances determines the location of the DP-line 92.

The major thermal resistances are the insulation board 84 and the blanket 87. The minor resistances are the remaining elements except the paint coat 83 and asphalt coat 85. The following tabulation gives the temperatures on the T-line 93 at various places:

|   | °F. |
|---|---|
| Cold side of shingles 88 | −3.0 |
| Warm side of shingles 88 and cold side of blanket 87 | +3.0 |
| Warm side of blanket 87 and cold side of board 84 | 34.8 |
| Warm side of coat 85 and cold side of stud space | 55.0 |
| Warm side of stud space and cold side of lath 81 | 61.8 |
| Warm side of lath 81 and cold side of plaster 82 | 73.1 |
| Warm face of wall | 74.0 |

The terminal wall temperatures and the thermal resistances determine the location of the T-line 93. It is plain that the T-line at all points lies above the DP-line drawn on the same temperature scale. Thus the wall is free from danger of condensation throughout, for the extreme conditions of the table, and for less extreme conditions.

The Architectural Bulletin 40–17 (Insulation and Ventilation) issued by the Detroit Insuring Office of FHA, dated February 24, 1941, specifies for water-vapor resister elements of walls a maximum water vapor transmission value of 2.50 grams per hour per sq. ft. per pound pressure-per-sq.-in. of vapor pressure differential. In terms of the units herein given, this specification is 21.4 lbs. per 2500 sq. ft. per 24 hours, per pound pressure-per-sq.-in. of vapor pressure differential.

In Fig. 4 the elements have the thermal and vapor transmission values as given below:

| Element of Fig. 4 | Thermal Conductance, B. t. u. per Hr. per sq. ft. 1° F. | Water Vapor Transmission, Lbs. per 2,500 Sq. ft. per 24 hrs. per lb. per sq. in. V. P. D. |
|---|---|---|
| Paint 83 | 2.00 | 25 |
| Lath and Plaster 81–82 |  | 100 |
| Lath 81 | .68 |  |
| Stud space | 1.10 |  |
| Asphalt coat 85 |  | 10 |
| Coated board 84–85 | .38 |  |
| Blanket 87 | .24 |  |
| Shingles 88 | 1.28 | 1,000 |
| Overall | .099 | 6.4 |

From the foregoing table it will be seen that the paint coat 83 of Fig. 3 relied upon as the first vapor resistance has a transmission value of 25, which is above the maximum of 21.4 specified by the said Bulletin. It is a logical conclusion from the teachings of the present invention that such a specification of a maximum is without foundation and without meaning, and is the result of incomplete knowledge of the subject.

It is further to be understood that the invention contemplates insulation preferably as a unit, such as blanket 46—50, or blanket 49—46—50 of Fig. 2. Consider such insulation as used between warm interior humid air at temperature $T_1$ and cold outside air at temperature $T_2$. The drop in temperature will be $T_1 - T_2$. The dew-point temperature on the warm side will be $D_1$ which is less than $T_1$, and on the cold side the dew-point temperature will be $D_2$ which is less than $T_2$. The drop in the dew-point-line will be $D_1 - D_2$. The dew-point depression on the warm side is $T_1 - D_1$. Using a unit such as "cold side—resistance 49—insulation 46—warm side," it is obvious that the fall $D_1 - D_2$ will take place in resistance 49, and the dew-point may and can cross the temperature gradient representing $T_1-T_2$. But if the arrangement is reversed to give the combination "cold side—insulation 46—resistance 49—warm side," then the drop $D_1-D_2$ takes place in resistance 49 before the drop $T_1-T_2$ begins. Hence the steps cannot meet. But if the combination is "cold side—resistance 49—insulation 46—resistance 50—warm side" it is unpredictable just what will happen unless the resistances 49 and 50 are properly proportioned. The drop $D_1-D_2$ should be in lesser part in resistance 49 and in greater part in resistance 50. The resistance 50 must be of an efficiency, for the conditions present, to bring the first drop to a temperature below $T_2$. For protection of the insulation the value $T_1-T_2$ must be less than the value $(T_1-D_1)+(D_1-D_2)$, or $T_1-D_2$. In other words $$\frac{T_1-D_2}{T_1-T_2}$$

is greater than 1.

The invention is not to be considered as limited to or by the particular examples herein given to explain and illustrate the same, and it is to be understood that many other constructions fall within the scope of the invention as expressed in the appended claims.

I claim:

1. A universal condensation-free wall comprising parallel spaced supports for the wall, lath and plaster on the warm side of said supports, a layer of material on the face of said plaster, said material being in film-like form and characterized by ability to transmit water vapor to a degree on the order of the transmissibility of a coat of paint, insulation sheathing on the cold side of said supports, said sheathing having on the warm-side face a layer of water-vapor resistant material characterized by ability to transmit water vapor to a degree comparable to a coat of asphalt, a layer of insulation having substantially no resistance to the transmission of water-vapor on the cold side of said sheathing, and a layer of overlapping siding elements on the cold side of said insulation, said two layers of water-vapor resistant materials being the only effective water-vapor resistances in the wall, the one on the plaster in a temperature-structure plot of the wall effecting in the space between the supports a dew-point line below the temperature-line in said space, and the other one effecting in said layer of insulation a dew-point line substantially the same as that on the exterior of the overlapping siding elements.

2. A space-enclosing insulating structure which is free from danger of condensation of water vapor therein for terminal conditions corresponding on the warm side to heated humid living interiors and on the cold side to freezing atmospheric exteriors, comprising spaced supports providing a dead air space within the structure, a warm-side finishing structure on said supports consisting in the direction from said supports toward the warm side of lath, plaster and a coating composition having an appreciable resistance to the passage of water vapor on the order of 25 lbs. of water vapor per 2500 sq. ft. per 24 hours per lb. per sq. inch of vapor-pressure-differential, and a cold-side finishing structure on said supports consisting in the direction from said supports toward the cold side of a film of composition having a water-vapor transmission of the order of 10 lbs. of water vapor per 2500 sq. ft. per 24 hours per lb. per sq. inch of vapor-pressure-differential, an adjacent insulation board having a minor and relatively low resistance to the passage of water vapor and having a thermal conductance of about .38 B. t. u. per hour per sq. ft. per 1° F. of temperature-differential, an adjacent insulation blanket having substantially no resistance to the passage of water vapor and having a thermal conductance of about .24 B. t. u. per hour per sq. ft. per 1° F. of temperature-differential, and an adjacent layer of finishing material having substantially no resistance to the passage of water vapor and having a moderate thermal conductance of about 1.28 B. t. u. per hour per sq. ft. per 1° F. of temperature-differential, whereby said thermal and vapor resistances keep the temperature-line through the cross-section diagram above the dew-point line of said diagram for said terminal conditions of temperature and relative humidity.

CLARK C. HERITAGE.

REFERENCES CITED

The following references are of record in the file of this patent:

UNITED STATES PATENTS

| Number | Name | Date |
|---|---|---|
| 2,030,668 | Weyerhaeuser et al. | Feb. 11, 1936 |
| 2,245,611 | Schultz | June 17, 1941 |
| 2,256,435 | Kraus | Sept. 16, 1941 |
| 2,264,961 | Ward | Dec. 2, 1941 |
| 2,264,976 | Heritage | Dec. 2, 1941 |
| 2,266,599 | Hasenburger et al. | Dec. 16, 1941 |
| 2,324,218 | Kraus | July 13, 1943 |
| 2,324,971 | Woodward | July 20, 1943 |

OTHER REFERENCES

Printed publication, U. S. Department of Commerce, Bureau of Standards Report, BMS63, 14 pages.

Article by L. V. Teesdale, Heating and Ventilating, April 1939, pages 36 through 40.

Printed publication, article by L. V. Teesdale, Forest Products Lab., Dept. of Agriculture, Condensation in Walls and Attics, pages 1 to 11.

American Roofer for July 1942, Moisture Condensation in Barns, by L. V. Teesdale, page 21.

Certificate of Correction

Patent No. 2,541,762 February 13, 1951

CLARK C. HERITAGE

It is hereby certified that error appears in the printed specification of the above numbered patent requiring correction as follows:

Column 2, line 22, after the word "room" insert *into*; column 3, line 10, for "The" read *These*; column 8, line 66, for "where k is" read *where k' is*; column 9, line 36, for "vapors" read *vapor*; column 14, line 40, in the table, column 2 thereof, for "ft. 1° F." read *ft. per 1° F.*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*